(12) United States Patent
Becker et al.

(10) Patent No.: US 6,606,508 B2
(45) Date of Patent: *Aug. 12, 2003

(54) METHOD FOR HANDLING PHONE NUMBERS IN MOBILE STATION AND MOBILE STATION

(75) Inventors: Stefan Becker, Salo (FI); Juha Kurkilahti, Piispanristi (FI)

(73) Assignee: Nokia Mobile Phones Ltd., Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/141,062

(22) Filed: Aug. 27, 1998

(65) Prior Publication Data

US 2001/0041600 A1 Nov. 15, 2001

(30) Foreign Application Priority Data

Sep. 4, 1997 (FI) .................................................. 973601

(51) Int. Cl.[7] .............................. H04B 1/38; H04M 1/00
(52) U.S. Cl. ........................ 455/567; 455/415; 455/566
(58) Field of Search ................................ 455/566, 567, 455/415, 550, 90, 575; 379/164, 179, 93.17, 93.23, 56.3; 340/825.44, 825.47, 825.48

(56) References Cited

U.S. PATENT DOCUMENTS

| | | | |
|---|---|---|---|
| 4,995,075 A | | 2/1991 | Angiolillo-Bent et al. .. 379/142 |
| 5,073,922 A | * | 12/1991 | Okada ........................ 379/164 |
| 5,203,014 A | * | 4/1993 | Wagai et al. ............... 455/38.2 |
| 5,210,753 A | * | 5/1993 | Natarajan .................... 455/443 |
| 5,442,692 A | | 8/1995 | Yamazaki et al. .......... 379/253 |
| 5,448,622 A | | 9/1995 | Huttunen ....................... 379/58 |
| 5,559,860 A | | 9/1996 | Mizikovsky .................. 379/58 |
| 5,696,817 A | | 12/1997 | Yatsu .......................... 379/252 |
| 5,870,683 A | * | 2/1999 | Wells et al. ................. 455/566 |
| 5,907,604 A | * | 5/1999 | Hsu ......................... 379/93.23 |
| 5,946,636 A | * | 8/1999 | Uyeno et al. ................ 455/566 |

FOREIGN PATENT DOCUMENTS

| | | |
|---|---|---|
| GB | 2 287 377 | 9/1995 |
| WO | WO 93/26132 | 12/1993 |
| WO | WO 96/27974 | 9/1996 |

OTHER PUBLICATIONS

Finnish Search Report.
EPO Communication.
Finnish Search Report.

* cited by examiner

Primary Examiner—Quochien Vuong
(74) Attorney, Agent, or Firm—Perman & Green, LLP

(57) ABSTRACT

The invention relates to a method for handling phone numbers in a mobile station and a mobile station. According to the invention, numbers (3a, 3b, 3c) are handled in groups (1a, 1b, 1c) which have different attributes (2a, 2b, 2c). The attributes (2a, 2b, 2c) mean e.g. rights to generate a ringing tone. In a certain operating mode, only a call belonging to a group (1a, 1b, 1c) which in that operating mode has the right to call the mobile station, will generate a ringing tone. The attributes (2a, 2b, 2c) also mean group-specific ringing tones which represent the type of the group (1a, 1b, 1c). The attributes (2a, 2b, 2c) further mean symbols on the display of a mobile station.

17 Claims, 3 Drawing Sheets

METHOD FOR HANDLING PHONE NUMBERS IN MOBILE STATION AND MOBILE STATION

Figure 1:
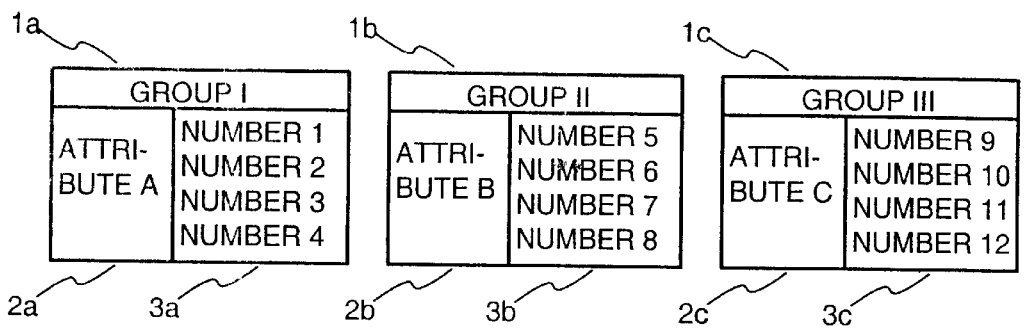

The invention relates to the method defined in the preamble of claim 1 for handling phone numbers in a mobile station and to the mobile station defined in the preamble of claim 6.

From the prior art it is known to store numbers and corresponding names or the like in mobile stations or their memory cards. A phone number and a corresponding text code are stored. A number can be dialled browsing either the numbers or the codes. As a call comes in to the mobile station, a text code is displayed.

The problem with the known devices is that there is no distinction between numbers as regards call reception. Only the name associated with the number can be seen.

An object of the invention is to eliminate the disadvantages described above.

The method according to the invention is characterised in what is expressed in claim 1. The apparatus according to the invention is characterised in what is expressed in claim 6. Preferred embodiments of the invention are presented in the sub-claims.

The invention relates to a method for handling phone numbers in a mobile station. According to the invention, numbers are handled in groups 1a, 1b, 1c which have different attributes 2a, 2b, 2c.

In an embodiment of the invention the attributes 2a, 2b, 2c are rights to generate a ringing tone 7, 8, 9, 10. In an operating mode, only a call belonging to a group which in that operating mode may call the mobile station will generate a ringing tone.

In an embodiment of the invention the attributes 2a, 2b, 2c are different ringing tones 7, 8, 9. The ringing tones are specific to groups, each indicating the type of a group.

In an embodiment of the invention the attributes 2a, 2b, 2c are symbols indicating a group 1a, 1b, 1c on the display of the mobile station. The symbols are specific to groups, each indicating the type of a group.

In an embodiment of the invention the symbols 19a representing the groups 1a, 1b, 1c on the mobile station's display are dynamic. Such a dynamic symbol 19a is e.g. a throbbing heart.

The invention also relates to a mobile station 18. In accordance with the invention it comprises a processor 11 for handling number groups and determining attributes and a memory 12 for storing number groups. Such a mobile station is possibly fully voice-controlled and thus requires no other input means.

According to an embodiment of the invention it also comprises an audio part 15 for producing a group-specific ringing tone.

According to an embodiment of the invention it also comprises a keypad 14 for entering and selecting numbers and number groups. This represents an ordinary basic model of a mobile station.

According to an embodiment of the invention it further comprises a display 13 for displaying the symbol 19a of a number group. This represents an ordinary mobile station having a display.

According to an embodiment of the invention it further comprises an IR link 16, 18b, 19b for loading the number group symbol 19a to the mobile station 18.

An advantage of the invention is that attributes are defined in a mobile station according to a number and its group. These attributes preferably are ringing tones and symbols characteristic to a group as well as other specifications in the mobile station.

Figure 2:
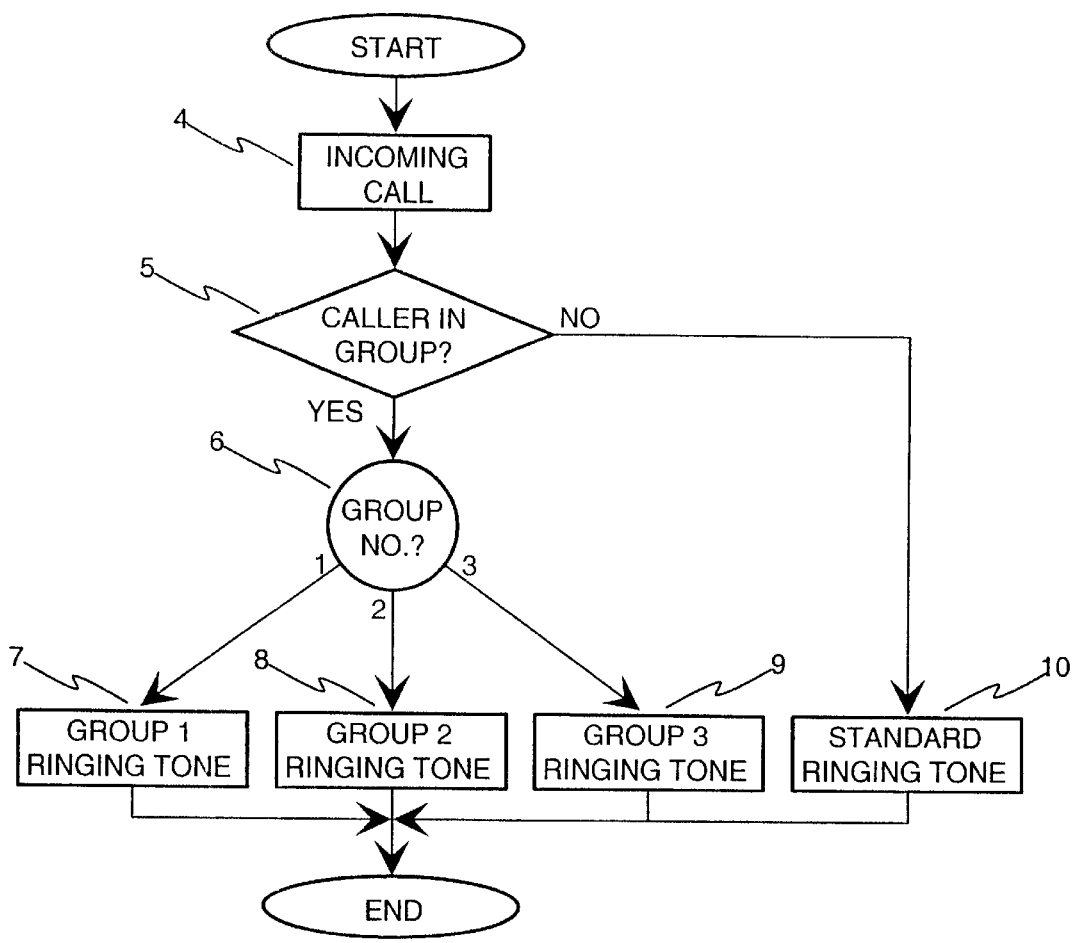
Figure 3:
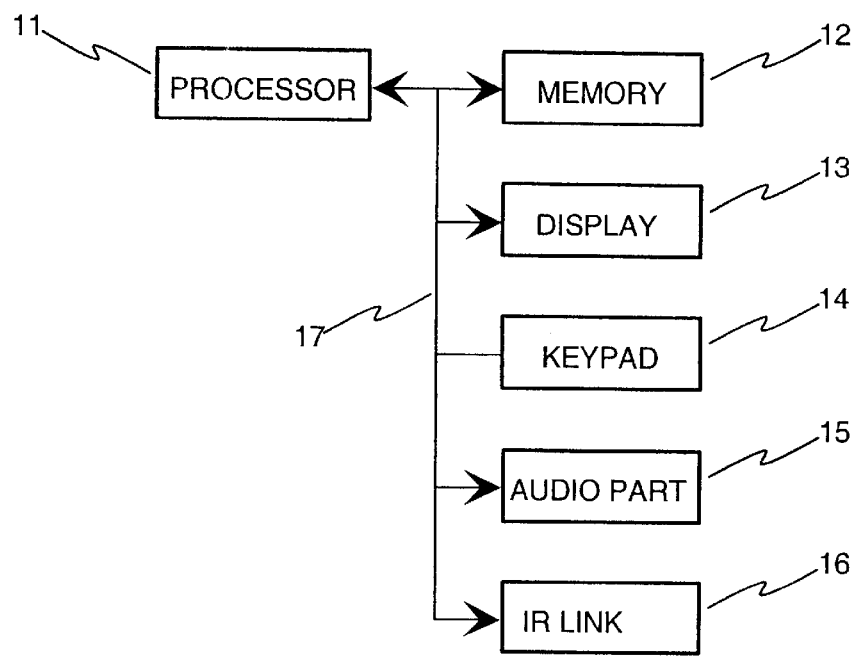
Figure 4:
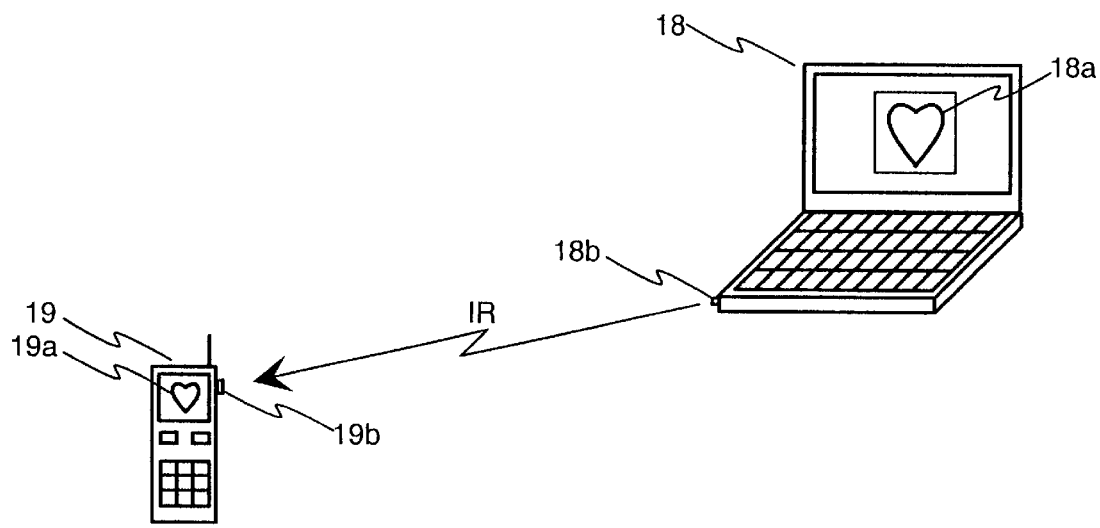
Figure 5:
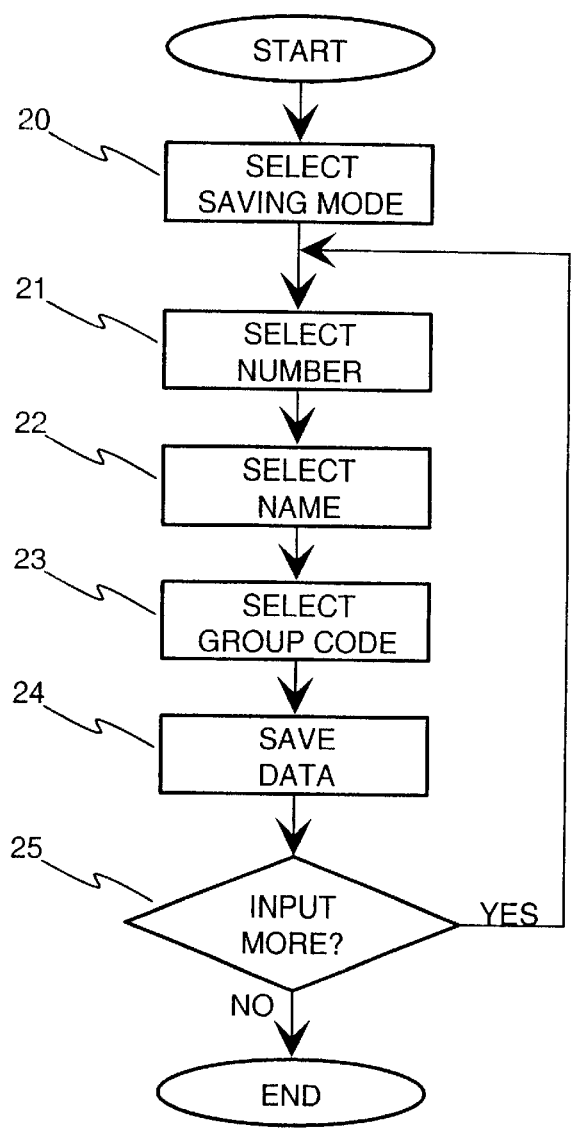
Figure 6:
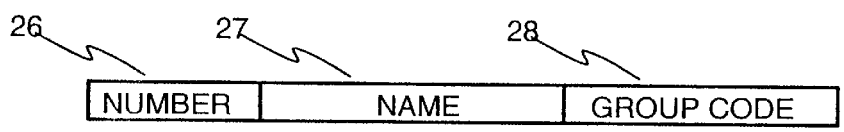

The invention is described in more detail with reference to the accompanying drawing wherein FIG. 1 shows groups according to the invention, FIG. 2 shows in the form of flow diagram the method according to the invention, FIG. 3 shows in the form of block diagram the essential elements of an apparatus according to the invention, FIG. 4 shows the transfer of a group symbol according to the invention to a mobile station, FIG. 5 shows in the form of flow diagram a method according to the invention for inputting numbers, and FIG. 6 shows the structure of a called party's data element in the memory of the apparatus.

FIG. 1 shows number groups according to the invention. Group 1a comprises home numbers, 1b office numbers, and 1c customers' numbers. Group attributes 2a, 2b, 2c are shown on the left-hand side of the group tables 1a, 1b, 1c. The groups contain numbers 3a, 3b, 3c.

FIG. 2 shows in the form of flow diagram the method according to the invention as regards the indication of an incoming call. As a call arrives 4 in a mobile station, the network provides the caller's number. The mobile station checks 5 whether the caller's number is included in a group. This is indicated such that a group code is associated in the memory with a number belonging to a group. If the caller's number belongs to a group, operation branches 6 according to the group number and a ringing tone 7, 8, 9 is generated according to the group. If the caller's number does not belong to any group, a standard ringing tone 10 is generated.

FIG. 3 shows in the form of block diagram essential parts of a mobile station according to the invention. A processor 11 executes in the memory 12 a program which includes a function for making groups. A group symbol is displayed on the display 13, numbers and groups are input on the keyboard 14, and a group-specific ringing tone is generated in the audio part 15. The group symbol can be loaded via an infrared (IR) link. The elements are interconnected through an internal communication bus 17 in the mobile station.

FIG. 4 shows the transfer of a group symbol 19a according to the invention in the form of bitmap 18a from a microcomputer 18 to a mobile station 19 via an IR link 18b, 19b. The hearts 18a, 19a shown in this Figure represent the family and friends symbol and they are created on the large display of the microcomputer 18. The mobile station's 19 display is smaller and thus the heart symbol 18a, 19a is also shown smaller.

Let us consider by way of example how a group symbol 19a is produced on a mobile station 19. Preferably the group symbol 19a is drawn up as a bitmap 18a on a microcomputer 18 using a drawing program. When finished, the bitmap 18a is transferred via an IR link 16, 18b, 19b from the microcomputer 18 to the mobile station 19. The microcomputer's IR transmitter 18b sends the information in the form of modulated light to the mobile station's IR receiver 19b. In the mobile station 19 the bitmap 18a is associated with a certain group 1a, 1b, 1c as group symbol. In advanced mobile stations the bitmap can be created using the apparatus' own software and keypad.

The group symbol is e.g. a heart, a happy/sad face or a stick figure. The group symbol is static or dynamically changing, comprising several images. The group ringing tone is advantageously created using a microcomputer 18 and sent via a link to a mobile station 19. Different ringing tones include e.g. beeps of various durations and musical melodies.

As a second example, let us consider a call from home to mobile station 19. A call is made from the mobile station user's home to the mobile station so that the mobile station 19 detects on the basis of the caller's number that the call is coming from home. The mobile station's display possibly shows the name associated with the number but additionally, in the manner according to the invention, the display also shows a group symbol, e.g. a heart 19a, and a group-specific ringing tone is sounded. So, the user knows even without looking at the apparatus, on the basis of the ringing tone, that the call is coming from the group in question, e.g. the family numbers group 1a. The ringing tone may thus be softer and melodic, representing a family matter, whereas a more traditional ringing tone is used for business matters.

FIG. 5 illustrates how numbers are input in groups in a manner according to the invention. First, a number saving mode is selected 20 using the push-buttons of the mobile station. Then, a number is selected 21 using the keypad and the selection is advantageously terminated by pressing a certain function key. A name is selected 22 and the selection is terminated in the same manner. A group code is selected, which preferably is an ordinal number. The ordinal number can advantageously be seen on the selection list of number groups which can be shown on the display. The data input are saved 24 by pressing a certain function key. A question is displayed on the display of the mobile station regarding the saving of additional numbers 25. If the answer is affirmative, the procedure returns to step 21 in which a number is selected. If the answer is negative, the saving mode is terminated.

FIG. 6 shows the structure of a table element for storing numbers and associated data in the memory of the apparatus. The table element comprises the called party's and/or caller's phone number 26, a name 27 and a group code 28. The phone number 26 advantageously comprises dialled digits fed to the mobile network, the name 27 alphabetical characters and the group code 28 one character only.

The groups may include e.g. VIPs, business, family, friends, etc. Advantageously the user creates the groups by means of the keypad and a menu.

The user may also define the attributes of the mobile station 19 such that only calls belonging to certain groups 1a, 1b, 1c will generate a ringing tone on the mobile station 19 during an important meeting, for example. In normal operating mode, numbers that do not belong to any group will generate the standard ringing tone.

The invention is not limited to the embodiments described above but many modifications are possible within the scope of the inventional idea defined by the claims set forth below.

What is claimed is:

1. A method for handling phone numbers in a mobile station, characterised in that numbers are handled in user defined groups for which different user defined attributes are specified, and wherein at least two attributes, an audible attribute and a visual attribute, are associated with each of the groups, the audible attribute comprising a group specific ringing tone and the visual attribute comprising an image.

2. The method of claim 1, characterised in that one of the attributes is a ringing tone.

3. The method of claim 3, characterised in that each group is associated with a different ringing tone.

4. The method of claim 1, characterised in that one of the attributes is a symbol representing a group, shown on a display of the mobile station.

5. The method of claim 4, characterised in that the symbol representing the group on the display of the mobile station is a dynamic symbol.

6. The method of claim 5 wherein the dynamic symbol is comprised of several images.

7. The method of claim 4 wherein the symbol is a bitmap image.

8. A mobile station comprising:
a processor for handling number groups and defining attributes, and
a memory connected to the processor for storing number groups, wherein the processor is adapted to associate at least an audible attribute as a group specific ringing tone to a group in a plurality of groups and a visual attribute as a group specific image to the group.

9. The mobile station of claim 8, characterised in that further comprises an audio part for sounding a group-specific ringing tone.

10. The mobile station of claim 8, characterised in that it further comprises a keypad for inputting and selecting numbers and number groups.

11. The mobile station of claim 8, characterised in that it further comprises a display for displaying a symbol of a number group.

12. The mobile station of claim 8, characterised in that it further comprises an IR link for loading a symbol of a number group to the mobile station.

13. A method of determining a source of an incoming telephone call to a mobile station comprising the steps of:
assigning one or more phone numbers to a user defined group selected from a plurality of user defined groups;
assigning at least one user defined audible attribute to each group in the plurality of groups, each group having a different audible attribute comprising a group specific ringing tone;
assigning at least one user defined visual attribute to each group in the plurality of groups, each group having a different visual attribute comprising an image; and
wherein when a telephone call is received by the mobile station a source telephone number of the incoming call is compared to each of the phone numbers in each group, and when the source number of the incoming call corresponds to a number in one of the groups, the at least one audible attribute and the at least one visual attributed associated with the group are presented to a user of the mobile station.

14. The method of claim 13 wherein the step of assigning an audible attribute comprises the step of assigning a ringing tone.

15. The method of claim 13 wherein the step of assigning a visual attribute comprises the step of assigning a symbol image.

16. A method for identifying a call received by a mobile station comprising the steps of:
defining in the mobile station at least one group, each group to be associated with one or more group specific callers;
assigning one or more caller identity numbers to each group;
assigning at least one audible and at least one visual attribute to each group;
wherein when a call is received by the mobile station, the mobile station determines a caller identity and a group associated with the caller identity and generates the at least one audible and at least one visual attribute associated with the group.

17. A mobile station comprising:
a processor adapted to handle at least one user defined group, each group including at least one caller identifier, and having at least one user defined visual attribute and at least one user defined audible attribute;

a memory connected to the processor, the memory adapted to store each group, wherein when a call is received by the mobile station, the processor is adapted to associate a caller identifier of the call with one of the user defined groups, and associate the at least one visual attribute and at least one audible attribute with the group in order to generate the at least one visual attribute and the at least one audible attribute.

* * * * *